United States Patent [19]
Sheng

[11] 3,761,801
[45] Sept. 25, 1973

[54] MICROPOWER, LOW-VOLTAGE, REGULATOR CIRCUITS

[75] Inventor: Abel Ching Nam Sheng, Morris Plains, N.J.

[73] Assignee: RCA Corporation, Princeton, N.J.

[22] Filed: Sept. 5, 1972

[21] Appl. No.: 286,084

[52] U.S. Cl. ............... 323/22 T, 323/4, 323/39
[51] Int. Cl. ............................................. G05f 1/56
[58] Field of Search ............... 323/1, 4, 16, 19, 323/227, 38, 39

[56] References Cited
UNITED STATES PATENTS

| | | | |
|---|---|---|---|
| 3,641,423 | 2/1972 | Stauffer | 323/19 X |
| 3,383,612 | 5/1968 | Harwood | 323/22 T |
| 3,679,961 | 7/1972 | Hamilton | 323/19 X |
| 3,320,439 | 5/1967 | Widlar | 323/22 T |

Primary Examiner—A. D. Pellinen
Attorney—H. Christoffersen et al.

[57] ABSTRACT

Current is supplied to a load through a first transistor. A pair of diodes series connected across the load senses the load voltage. When this voltage exceeds the desired level--the voltage threshold for conduction through the pair of diodes, they place a shunt path across the emitter-to-base circuit of the transistor. This reduces the transistor base current, causing less current to flow to the load and reducing the voltage across the load to the desired level.

11 Claims, 2 Drawing Figures

PATENTED SEP 25 1973  3,761,801

MICROPOWER, LOW-VOLTAGE, REGULATOR CIRCUITS

BACKGROUND OF THE INVENTION

There is a need in certain small electronic instruments, such as in electronic wrist watches, for a regulated power supply which operates at low voltage levels and which dissipates only infinitesimal amounts of standby power. Low operating voltage levels are encountered, for example, when the primary power source is a single cell battery. It is important that this battery last a long time and this implies very low standby power consumption.

It is conventional to employ feedback control transistor circuits for current and voltage regulation; however, none is known which meets the stringent requirements above. Typical in a number of ways of such circuits is one described in Anderson U.S. Pat. No. 3,109,982 titled "Transistor Regulators" issued Nov. 5, 1963. This circuit requires high standby current — in the milliampere range. There is a Zener diode 18, serving as a voltage reference, in series with a resistor 7 across the input terminals, which means that the operating voltage must be greater than 6 volts — the drop across the Zener diode, whereas in the applications above the input voltage may be less than 2 volts. There is a second Zener diode 21 in series with the emitter-to-collector path of transistor $Q_4$ which means that the regulated voltage also must be greater than 6 vols.

SUMMARY OF THE INVENTION

Means responsive to the control current supplies a current to a load. Diode means are connected across the load. When the voltage across the load increases to a value at which conduction through the diode means occurs, they cause a portion of the control current to be by-passed.

DETAILED DESCRIPTION

Figure 1:
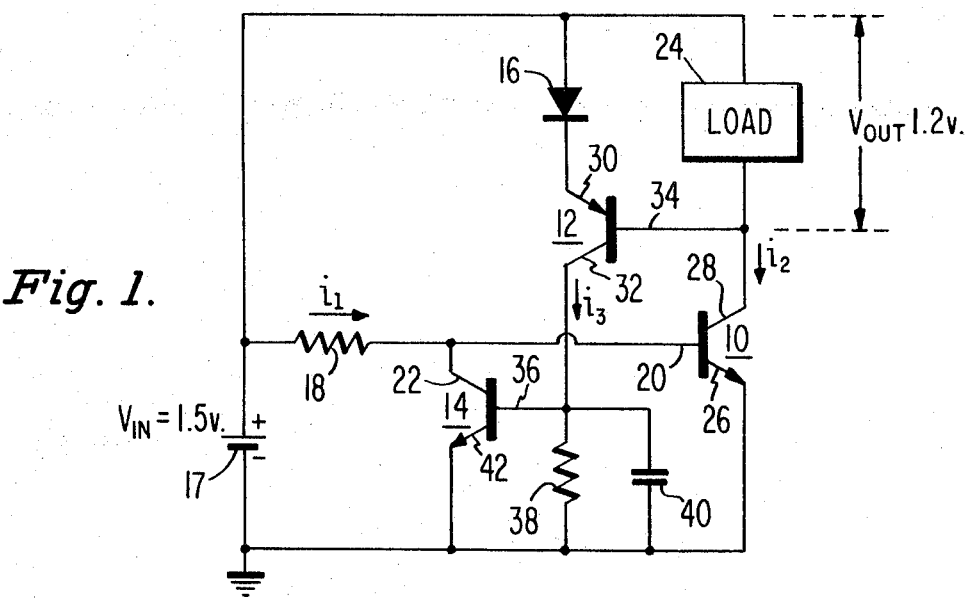
FIG. 1 is a schematic drawing of a regulator according to one embodiment of the invention.

The circuit shown in FIG. 1 includes three transistors 10, 12 and 14 and a diode 16. The power supply may be a small battery 17. It is connected at its negative terminal to a source of reference potential such as ground, and connected at its positive terminal through resistor 18 to the base 20 of NPN transistor 10 and the collector 22 of NPN transistor 14. The load 24 is connected in series with the emitter 26-to-collector 28 path of transistor 10.

Diode 16 is connected in series with the emitter 30-to-collector 32 path of PNP transistor 12. This transistor is connected at its base 34 to the connection between the collector 28 and load 24. The collector 32 of transistor 12 is connected to the base 36 of transistor 14. A resistor-capacitor network 38, 40 is connected between the base 36 and ground.

In the operation of the circuit of FIG. 1, the power supply 17 provides the current $i_1$ to the base 20-to-emitter 26 diode of transistor 10. This current is sufficient to turn on this transistor and current $i_2$ flows from battery 17 through the load 24 and into the collector-to-emitter path of transistor 10. This current causes a voltage $V_{out}$ to develop across the load.

The diode 16 and the emitter 30-to-base 34 diode of transistor 12 are connected in series across the load 24. The diodes are silicon devices and each starts conducting at approximately 0.60 volts in the forward direction across the diode (at this voltage they conduct about 300 nanoamperes). These two diodes act as a voltage reference; that is, when the output voltage attempts to exceed the combined threshold level of 1.2 volts, the two diodes start to conduct. When they do, transistor 12 turns on and current $I_3$ flows through the emitter 30-to-collector 32 path of this transistor. A portion of this current flows into the base 36-to-emitter 42 path of transistor 14. This causes transistor 14 to turn on and its collector 22 to emitter 42 path acts as a shunt for a portion of the input current $i_1$. A sufficient amount of this input current passes through the shunt path to reduce the current $i_2$ sufficiently to maintain the load voltage at the desired value of 1.2 volts.

With the beta of transistor 10 chosen to be greater than 2,000, the standby current, that is, the current which flows when the load is not drawing current, is less than 1 microampere (less than $1 \times 10^{-6}$ amperes). The circuit is found to maintain substantially constant (to within 1 percent) the output voltage at a value of 1.2 volts over an input voltage range of 1.3 to 1.6 volts. The circuit is found to be relatively insensitive to temperature variation, the output voltage changing less than 10% in an ambient temperature range of 0° C–50°C.

The function of the resistor 38-capacitor 40 integrating circuit is to eliminate oscillations. Such oscillations tend to occur because of the high gain in the feedback circuit. The resistor capacitor circuit dampens any such tendency.

A further feature of the circuit of FIG. 1 is that it is capable of providing very good regulation even though there is little difference between the input and output voltage values. The power supply 17 may be a conventional single cell battery with a nominal output voltage of 1.5 volts. With time, the voltage reduces. Notwithstanding this, the regulator of FIG. 1 must maintain the output voltage level at 1.2 volts throughout the useful life of the battery.

The circuit of FIG. 1 may be implemented with a type CA 3096 integrated circuit bipolar array. This includes the two NPN transistors 10 and 14 and the PNP transistor 12. The diode 16, in practice, may be the emitter-to-base diode of the second PNP transistor of the integrated circuit (the transistor may be connected base-to-collector to operate as a diode). The resistors 18 and 38 and the capacitors 40 were not integrated in a circuit which was built and and operated. These elements are connected to the integrated circuit terminals, as shown, and are external of the "chip". The resistors each may have a value of 100 kilo-ohms and the capacitor may have a value of 0.1 microfarad.

Figure 2:
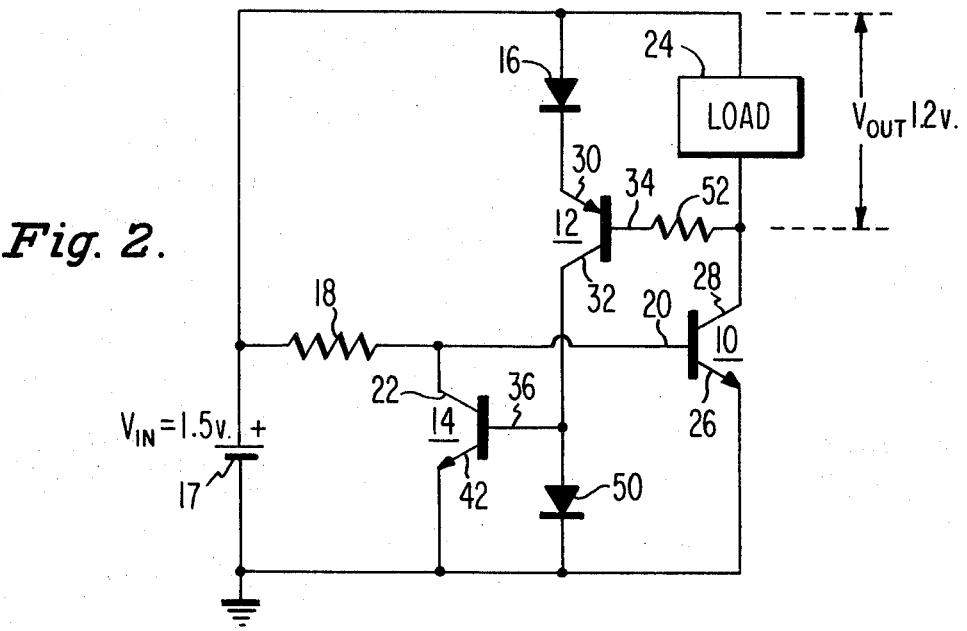
FIG. 2 is a schematic drawing of a regulator according to a second embodiment of the invention.

The capacitor of FIG. 1 uses a considerable amount of space compared to the other elements shown. In applications where space is important, this capacitor may be eliminated and a diode 50 substituted for the resistor-capacitor network 38, 40 as shown in FIG. 2. It is also desirable when doing this to reduce the gain of the feedback loop by connecting a resistor 52 between the base 34 and the common connection between emitter 28 and load 24 as also shown in FIG. 2. The diode 50 may be a "matching diode" within the integrated circuit chip and resistor 52 may be external of the chip and have a value of 300 kilo-ohms. The "matching diode" is simply the third NPN transistor of the CA 3096 package which matches the $V_{be}$ characteristic of transistor 10 and which is connected base-to-collector to serve as the anode of the diode 50. The cathode of this diode is the emitter of the transistor.

The operation of the circuit of FIG. 2 is essentially identical to that of the operation of the FIG. 1 circuit but with reduced gain. The voltage regulation of the FIG. 2 circuit is not as good as that of the FIG. 1 circuit: however, it is still much better than 10%. Its power dissipation is low — under 1 microampere. The FIG. 2 circuit also is quite insensitive to temperature change.

The nominal output voltage of the FIG. 2 circuit is 1.2 volts. In practice, because there is an additional resistor 52 in the voltage sensory circuit, the output voltage is several millivolts higher than 1.2 volts.

An important feature of the present invention is the use of a pair of diodes, 16 and 30, 34 across the load for sensing the load voltage. These are not Zener diodes. The latter depend on the breakdown characteristic of the diode in the reverse direction and generally operate at relatively higher voltage levels. The diodes in the present circuit are connected in the forward direction across the load and start to conduct when the knee of the characteristic is reached (approximately 0.60 volts). Thus, the two diodes are able to regulate the output voltage at a low level—less than 1.5 volts.

Further, as the diode 30, 34 is part of a transistor, amplification at a high level is achieved resulting in extremely rapid control of the shunt path 22, 42 across the base 20-to-emitter 26 diode of transistor 10. And, of course, all of this at extremely low power dissipation—a fraction of a microampere standby current in one circuit built as shown in FIG. 1.

What is claimed is:

1. In a regulating circuit, in combination:
   means responsive to a control current for supplying current to a load at least sufficient to produce a voltage of a given value across said load;
   diode means having a voltage threshold for conduction equal to said given value connected in the forward direction across said load for sensing the voltage across said load; and
   means responsive to current flow in the forward direction through said diode means which occurs when the voltage across said load tends to exceed said given value for by-passing a sufficient portion of said control current to return the voltage across said load to its given value.

2. In a circuit as set forth in claim 1, said diode means comprising a plurality of series connected diodes.

3. In a circuit as set forth in claim 2, at least one of said diodes comprising the emitter-to-base diode of a transistor.

4. In a circuit as set forth in claim 1, the circuit for sensing the voltage across said load consisting solely of diodes.

5. In a circuit as set forth in claim 1, said means responsive to control current comprising a first transistor the emitter-to-collector path of which is essentially in series with said load and said control current being supplied to the base-to-emitter diode thereof, and said means for by-passing a portion of said control current comprising a second transistor the emitter-to-collector path of which is connected across the emitter-to-base diode of said first transistor and the base-to-emitter diode of which is connected to receive a current in response to current passing through said diode means.

6. In a circuit as set forth in claim 5, further including:
   a damping circuit connected across the emitter-to-base diode of said second transistor for reducing the tendency of said regulating circuit to oscillate.

7. In a circuit as set forth in claim 6, said damping circuit comprising a resistor in shunt with a capacitor.

8. In a circuit as set forth in claim 5, further including:
   a resistor in series with said diode means; and
   a diode connected in the forward direction across the emitter-to-base diode of said second transistor.

9. A regulating circuit for translating a supply voltage of less than two volts to a second, somewhat lower regulated voltage across a load comprising, in combination:
   a first transistor having an emitter-to-collector path and a base electrode, said emitter-to-collector path being connected in series with said load;
   input terminals to which said supply voltage may be applied connected to the base and emitter, respectively, of said first transistor for causing that transistor to supply sufficient current to said load to cause a voltage at least equal to said second voltage level to appear across said load;
   diode means connected across said load and having a threshold for conduction at said second voltage level; and
   a second transistor, the emitter-to-collector path of which is connected across the base-to-emitter path of said first transistor, and the base-to-emitter diode of which is connected to receive a flow of forward current in response to current flow through said diode means.

10. A regulating circuit as set forth in claim 9 wherein said supply voltage is that produced by a single cell battery and is approximately 1.5 volts and wherein said diode means comprises two silicon diodes series connected in the forward direction across said load.

11. A regulating circuit as set forth in claim 10 wherein one of said diodes comprises the emitter-to-base diode of a third transistor, the emitter-to-collector path of which is connected to the base-to-emitter diode of said second transistor.

* * * * *